United States Patent

[11] 3,581,640

| [72] | Inventor | Shuji Kimura |
| | | Tokyo, Japan |
| [21] | Appl. No. | 712,670 |
| [22] | Filed | Mar. 13, 1968 |
| [45] | Patented | June 1, 1971 |
| [73] | Assignee | Nippon Kogaku K.K. |
| | | Tokyo, Japan |
| [32] | Priority | Mar. 23, 1967 |
| [33] | | Japan |
| [31] | | 24024 |

[54] FILM ADVANCING MECHANISM FOR FILM ROLL CAMERAS HAVING DELAYED CLUTCH ACTION
4 Claims, 13 Drawing Figs.

| [52] | U.S. Cl. | 95/31 |
| [51] | Int. Cl. | G03b 9/68 |
| [50] | Field of Search | 95/31, 31 ACFS, 31 FSL |

[56] References Cited
UNITED STATES PATENTS

| 2,227,240 | 12/1940 | Becker | 95/31 |
| 2,266,656 | 12/1941 | Nuchterlein | 95/31 |
| 2,364,466 | 12/1944 | Nagel | 95/31 |
| 2,975,690 | 3/1961 | Beeck | 95/31 |
| 3,119,315 | 1/1964 | Lange | 95/31 |
| 3,186,322 | 6/1965 | Beach | 95/31 |
| 3,385,189 | 5/1968 | Hennig | 95/31 |
| 3,448,669 | 6/1969 | Suzuki | 95/31 |

*Primary Examiner*—Samuel S. Matthews
*Assistant Examiner*—Russell E. Adams, Jr.
*Attorney*—Anton J. Wille ABSTRACT: A film takeup arrangement is provided for a still camera in which the film leader of a roll film loaded into the camera is wound upon the takeup spool before the shutter charging mechanism of the camera is activated. A clutch mechanism is provided which is interlocked with the camera cover, the closing of the camera cover initiating a delayed clutch engagement of the takeup mechanism to permit the film leader to be first wound and then the shutter mechanism charged. The first film frame will be in position for exposure when the shutter mechanism is charged.

Patented June 1, 1971 3,581,640

Patented June 1, 1971 3,581,640
2 Sheets-Sheet 2
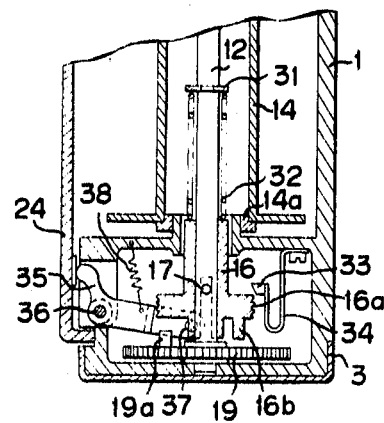
FIG. 6
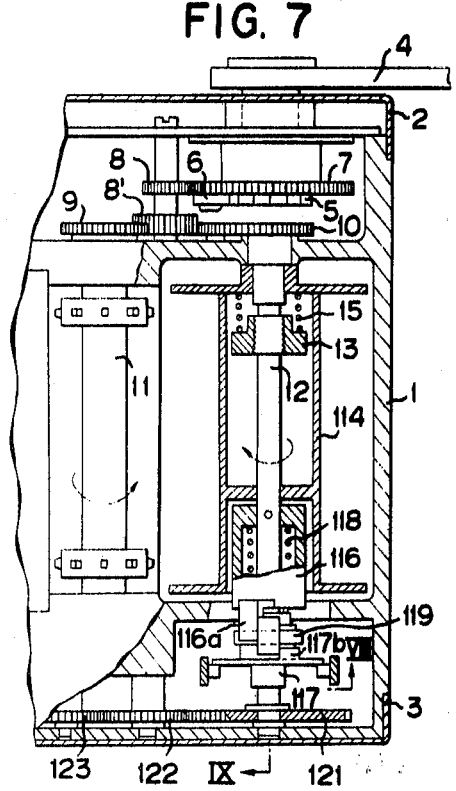
FIG. 7
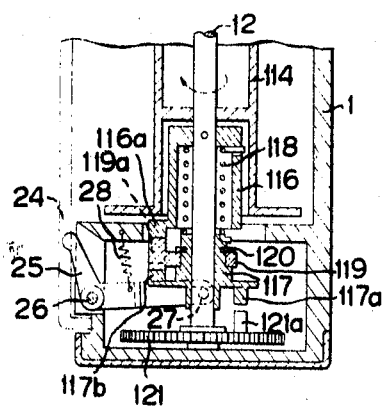
FIG. 9
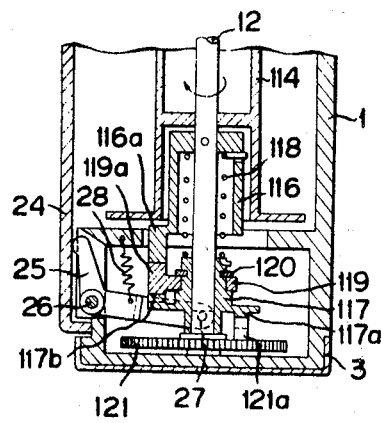
FIG. 10
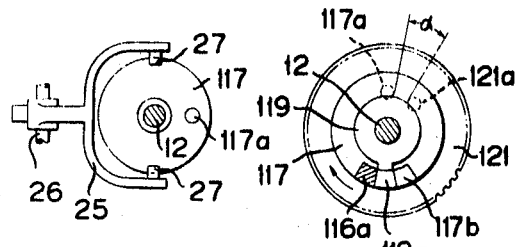
FIG. 8    FIG. 11
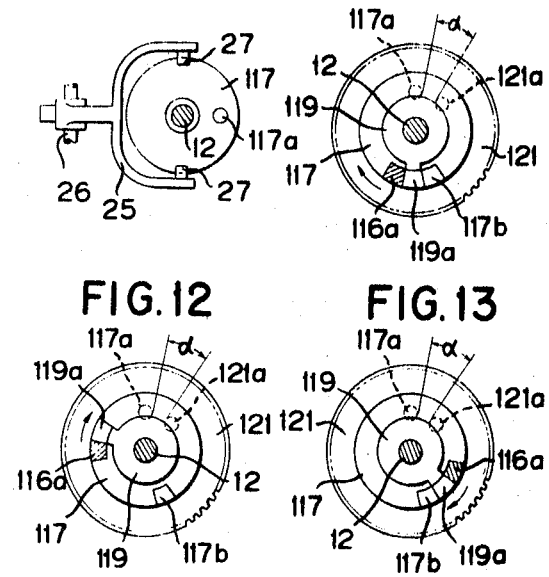
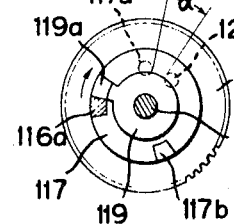
FIG. 12
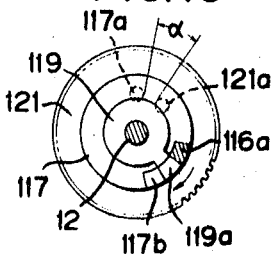
FIG. 13

FILM ADVANCING MECHANISM FOR FILM ROLL CAMERAS HAVING DELAYED CLUTCH ACTION

This invention relates to a film takeup device for a still camera, and more particularly to a takeup device in which the shutter mechanism is charged after the leader strip portion of a film roll is wound up and the first frame of the film roll is in exposure position.

In self-cocking shutter type cameras, particularly cameras having focal plane shutters, interconnecting means are provided between the film advancing mechanism and the shutter charging mechanism which upon film advance will cock the shutter. In such cameras, the film is advanced one frame during which time the shutter is cocked. Through detent or overtravel means when the shutter mechanism is charged, the film advancing mechanism is disabled so that the film cannot be advanced any further. It therefore becomes necessary to release the shutter each time the shutter mechanism is charged so that the film may be advanced another frame.

In loading a new roll of film into the camera, after the leader strip of the film is inserted into the takeup spool, the camera cover is closed and the film advanced a frame at a time, the frame advance being interrupted by the required release of the shutter mechanism. It is usual for the photographer to make allowances for the film leader and release the shutter several times before he is ready to make an exposure. This procedure entails making allowances for the length of the leader which can be readily overlooked and the first exposures made by the photographer being failures; and a resetting of the film counter before the first exposure is taken.

This invention provides a film advancing mechanism for a roll film camera in which these difficulties are overcome by providing a clutch mechanism activated upon the closure of the camera back, the operation of the clutch mechanism being delayed until the leader strip of the roll film is wound on the takeup spool. The shutter mechanism is charged when the film leader is wound up, the first frame for exposure being in a position to be exposed upon release of the shutter mechanism. In essence, one of the clutch members is provided with screw threads which are engaged by a control member when the camera is close. Upon rotation of the film advancing level or knob, this clutch member is also rotated and due to its engagement by the control member is brought into engagement, after a predetermined number of revolutions of the clutch member, with a clutch gear which in turn is geared to the shutter charging mechanism of the camera.

This invention will be described more clearly referring to the illustrative embodiments shown in the attached drawing, in which:

FIG. 6 is a view similar to FIG. 3 showing the operation of the second embodiment;

FIG. 7 is cross-sectional view showing the main portion of the third embodiment of this invention;

FIG. 8 shows a partial sectional view taken along the line VIII in FIG. 7;

FIG. 9 is a cross-sectional view across IX line of FIG. 7, and shows the state of the embodiment before the advance of the film;

FIG. 10 is a view similar to FIG. 9 illustrating the state of the embodiment after the film advance;

FIG. 11 is a sectional view of the spool shaft and clutch of FIG. 9 before film advance;

FIG. 12 is similar to FIG. 11 in which the spool shaft is rotated by a little more than one turn of rotation;

FIG. 13 is similar to FIG. 11 showing the spool and clutch after initial advance of the film.

Figure 1:
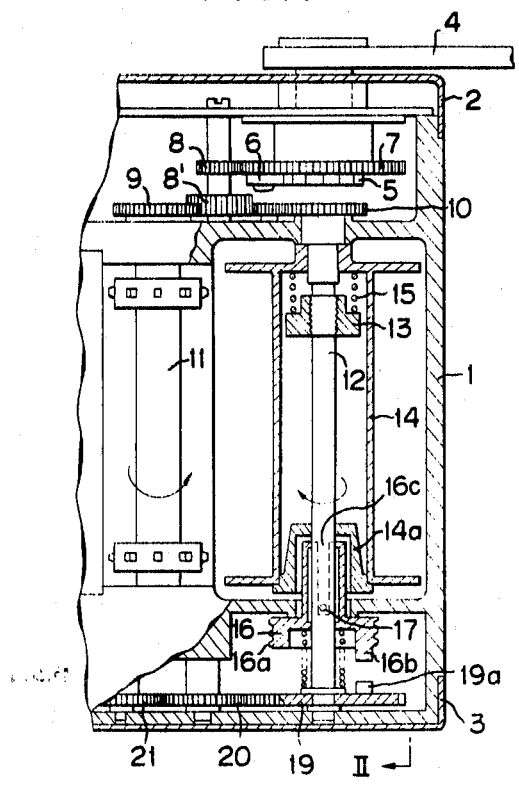
FIG. 1 is a cross-sectional view showing the main portion of the first embodiment of this invention.

Referring first to FIG. 1, there is shown the first embodiment wherein the controlling member is used as an interlocking member with the back cover in which a portion of a camera body 1 is illustrated having a top plate 2 and a bottom plate 3. Rotatably mounted on the top plate 2 of the camera body is a film takeup lever 5 suitably connected to a ratchet gear 5 within the camera body. A ratchet pawl 6 fixed to a rotatable takeup gear transmits the winding operation of the lever 4 and ratchet gear 5 through gear 7 to a compound gear 8, 8'. The gear portion 8' meshes with interlocking gears 9 and 10 secured respectively on the upper ends of a sprocket shaft 11 and a spool shaft 12 rotatably mounted in the camera body.

Threaded on the spool shaft 12 is a flange 13 coacting with a takeup spool 14 through a spring 15. The takeup spool is mounted on the shaft 12 with some clearance, the takeup spool rotating with the shaft 12 by the friction developed by the spring 15. Slidably mounted on the lower end of the takeup shaft is a driving clutch member 16 rotatable with the shaft 12 through a pin 17 fixed in the shaft and a key groove 16c formed in the clutch member. For purposes hereinafter appearing the clutch member 16 is formed with screw threads 16a on the peripheral surface thereof, and a dependent projection 16b fixed in the lower face thereof. With the pin and groove connection, the clutch member will be rotated upon rotation of the takeup shaft and may be moved longitudinally as will hereinafter appear.

Figure 2:
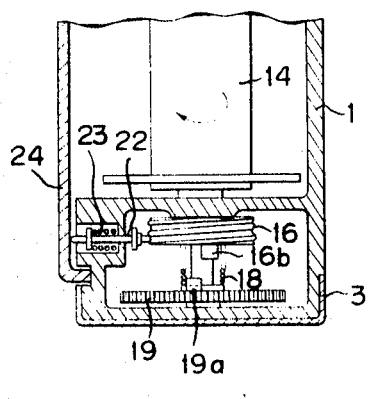
FIG. 2 is a side sectional view along line II of FIG. 1 in which the clutch elements are illustrated after the film is loaded into the camera and the cover closed.

A compression spring 18 is interposed between the clutch member 16 and a clutch gear 19 rotatably mounted on the lower end of shaft 12. The clutch gear 19 is provided with an upstanding projection 19a which is adapted to be engaged by the projection 16a when the clutch member 16 is moved downwardly against the bias of the spring 18. The clutch gear meshes with an intermediate gear 20 which in turn meshes with a shutter mechanism charging gear 21, the shutter mechanism being not otherwise illustrated, being well known in the art. Slidably mounted in the camera body 1 is a control member 22 biased by a spring 23 in a direction outwardly of the camera body but movable inwardly by the back cover 24 to bring the inner end of the member into engagement with the screw threads 16a on the clutch member 16 (FIG. 2).

Figure 3:
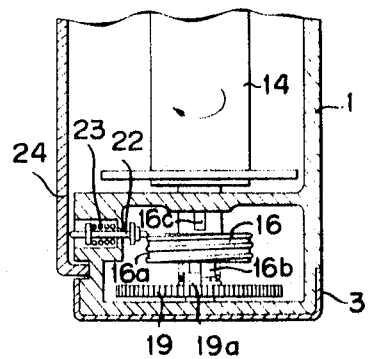
FIG. 3 is a view similar to FIG. 2 illustrating the clutch elements engaged.

When the film is loaded into the camera in the usual manner and the camera cover 24 is closed, the control member 22 is moved inwardly against the bias of spring 23 to engage the screw threads 16a. When the takeup lever is rotated to advance the film (leader), the sprocket shaft and takeup shaft will be rotated through the gears 7, 8, 8' and 9; the takeup spool 14 being rotated through the friction connection of the spring 15. With the control member 22 in engagement with the clutch member screw threads, the rotation of the clutch member by the shaft 12 will lower the clutch member until the clutch member projection engages the clutch gear projection 19a (FIG. 3). By proper selection of the pitch and number of threads on the clutch member 16, a given length of film or leader will be wound before the clutch member is engaged with the clutch gear to rotate the shutter charging mechanism so that the camera shutter is charged only once with the film leader would on the takeup spool and a frame in position for exposure upon release of the shutter.

When the film roll is exposed, and the film in a cartridge or cassette, the back cover 24 is opened and the control member 22 will be biased outwardly by the spring 23 to release the clutch member 16. The clutch member 16 is returned to its position in FIG. 1 by the bias of coil spring 18.

Figure 4:
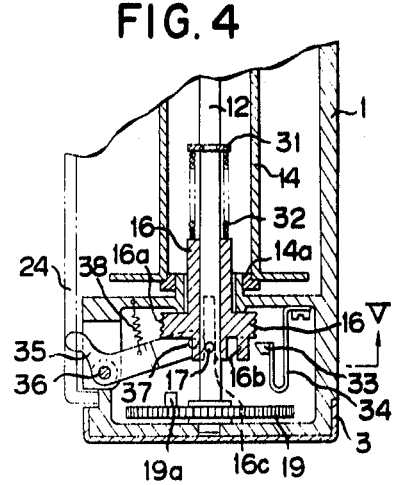
FIG. 4 is a side view showing the main portion of the second embodiment.

In FIG. 4 a second embodiment of the invention is illustrated wherein the same reference characters designate the same or similar elements as in FIG. 1. In this embodiment, a flange 31 is fixed to the takeup shaft 12 and a coil spring is interposed between the flange and the clutch member 16. A control member 33 is provided in this instance supported on a U-shaped resilient member 34 secured to the camera body, the end portion of the control member adapted to engage the screw threads 16a of the clutch member. An interlocking member 35 is provided pivoted on a shaft 36, one end of the member cooperating with the back cover 24.

Figure 5:
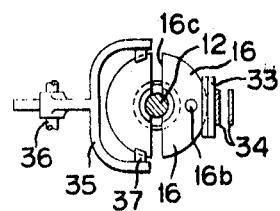
FIG. 5 is a sectional view taken along line V of FIG. 4.

The inner end of the interlocking member is bifurcated (FIG. 5) and provided with pins 37 abutting the undersurface of the clutch member due to the force of a spring 38. The force of the spring 38 is greater than that of the spring 32.

When the camera cover 24 is closed after loading the film into the camera, the interlocking member 35 is rotated clockwise to permit the clutch member 16 to be lowered by the force of the spring 32 to engage the control member 33 with the screw threads 16a of the clutch member. The film leader is advanced and wound on the takeup spool in the manner described before the clutch members become effective to advance the gear 21 of the shutter mechanism. After film exposure, when the camera cover is opened, the spring 38 will rotate the interlocking member 35 counterclockwise to raise the clutch member 16. The control member 33 due to its resilient mounting will be cammed aside by the screw threads of the clutch member. Should there be any possibility of the projections 16b and 19a abutting on the end surfaces, either or both projections could be mounted on resilient members so that one projection can slip past the other to bring the projection faces into abutting relation.

Referring now to FIG. 7 wherein a third embodiment of the invention is illustrated, a takeup spool 114 is mounted on the takeup shaft 12 in the manner described. A cylindrical member 116 is fixed to the shaft 12 and is formed with a dependent projection 116a. A flanged driving clutch member 117 is slidably and rotatably mounted on the takeup shaft and is formed with a dependent projection 117a adapted to engage an upstanding projection 121a formed on the clutch gear 121 rotatably mounted on the lower end of the shaft 12. The flanged clutch member is further provided with an upstanding projection 117b. Nested within the cylindrical member 116 is a spring 118 secured at one end to the cylindrical member and at the other end to the clutch member 117, the spring bearing the clutch member in a downward direction, and as will hereinafter appear be subjected to twisting and untwisting operations.

Rotatably mounted on the clutch member 117 is an intermediate ring 119 provided at its outer periphery with an upstanding and dependent projection 119a (FIGS. 9 and 10). As illustrated in FIGS. 11, 12 and 13, the projections 116a and the upper portion of projection 119a are rotatable within the same plane to carry out the first stage of the delaying operation.

The dependent portion of the projection 119a and the upstanding projection 117b of the clutch member are rotatable in the same plane to carry out the second stage of the delaying action.

Referring to FIGS. 11, 12 and 13, the relationship of the abutting faces of the projections 117a and 121a is illustrated, the angle α indicates a predetermined delay angle through which the projection 117a on the clutch member must travel before abutting the projection 119a on the clutch gear meshing with the shutter charging mechanism through gears 122 and 123. This delay angle may also include the slight errors arising in machining or cumulative tolerances during manufacture.

For carrying out the initial operation of the clutch mechanism, an interlocking lever 25 is rotatably mounted on a shaft 26, the lever being biased counterclockwise by a spring 28 (FIG. 9). With the camera cover 24 closed, the lever 25 is rotated clockwise as illustrated in FIG. 11. The inner end of the lever 25 is forked, the forked ends being provided with pins 27 which abut the underside of clutch member 117 without interfering with the projection 117a. It should be noted that the spring force of spring 28 is greater than that of spring 118.

With the film loaded into the camera and the end of the film or leader on the takeup spool 114, closing the back cover 24 will lower the interlocking member 25 to permit the spring 118 to move the clutch member 117 downwardly to place the projection 117a in its operational path with the upstanding projection 121a of the clutch gear. With the lowering of the clutch member 117, the intermediate ring 119 carried thereby is also lowered (FIG. 10). In the lowered position of the intermediate ring, the upper portion of projection 119a is engaged by the projection 116a on the cylindrical member due to the twisting bias of the spring 119. When the takeup lever 4 is rotated to wind the film leader, the cylindrical member 116 being fixed to the takeup shaft 12 will rotate almost a complete turn to abut the projection 116a on the opposite face of the projection 119a on the intermediate ring. As the takeup shaft continues to rotate, the cylindrical member 116 and the intermediate ring will be rotated together until the projection 119a abuts the clutch projection 117b on the clutch member to connect the takeup shaft 12 and the clutch member 117. Further rotation of the shaft 12 through the angle α will bring about an abutment of the projection 117a and the clutch gear projection 121a to charge the shutter mechanism, the spring 118 meanwhile being twisted due to its connection to members 116 and 117. Further rotation of the shaft 12 will be halted due to the conventional interlock of the shutter charging mechanism, the film leader however being wound on the takeup spool 114 and the first frame of the film in position for exposure.

It will be readily understood that the number of intermediate rings 119 rotatably mounted on the clutch member 117 may be varied and the radial and circumferential lengths of abutting projections on the rings varied so that the takeup shaft 12 will be rotated a given number of revolutions and through the angle α before the drive of the shaft is coupled to the clutch gear.

When the roll of film is completely exposed and the cover opened to remove the film cartridge, the interlocking member 25 will be moved upwardly tending to move the clutch member 117 in the same direction. The twisted spring 118 will restore itself to rotate the clutch member to its disengaged position as illustrated in FIGS. 9 and 11. It will be appreciated that the direction of movement of the interlocking member 25 and the spring 118 are relative so that the directions could be reversed and still obtain the same results.

What I claim is:

1. In a roll film camera having a film winding and shutter cocking device by which the shutter is tensioned during film winding operation, the combination comprising:

a camera housing having a cover movable between a closed position and an open position for inserting the roll film into the camera, a driving lever manually operable from outside of the camera, film transport driving means having a one-way clutch coupled to said driving lever and a driving shaft connected to said one-way clutch by gearing, a transmission device interposed between said driving shaft and the shutter cocking device to operatively connect the former to the latter, rotatable clutch means in said transmission device operable to delay the shutter cocking operation until the winding of a leader strip of the film has been completed, and means for actuating said clutch means in cooperation with the movement of said cover whereby only when said cover is moved in its closed position, said rotatable clutch is operated by the winding movement of said driving lever.

2. The combination according to claim 1, wherein said rotatable clutch means includes:

a driving member axially slidable on said driving shaft and rotatable therewith, a driven member connected to the shutter cocking device by gearing and disengaged from said driving member by a spring when said cover is opened, and a screw thread formed on outer periphery of said driving member and engageable with said clutch actuating means to cause axially movement of said driving member toward said driven member by rotation thereof when said cover is closed.

3. The combination according to claim 1 wherein said rotatable clutch means includes:
- a driving member axially slidable on said driving shaft and rotatable therewith,
- a driven member connected to the shutter cocking device by gearing, said driving member being urged toward said driven member by a spring,
- a screw thread formed on outer periphery of said driving member, and
- a resilient follower member on the camera body engageable with said screw thread for controlling the axial movement of said driving member, said clutch actuating means includes a pivotable lever coupled to said driving member and moved in cooperation with said cover; when said pivotable lever is disengaged from said driving member by the movement of said cover to the closed position thereof, said screw thread is engaged by said resilient follower member to move the driving member axially to engage said driving member and said driven member upon winding movement of said driving lever.

4. The combination according to claim 1, wherein said rotatable clutch means includes:
- a cylindrical member fixed on said driving shaft and having a dependent projection,
- a driving clutch member slidably and rotatably mounted on said driving shaft and having a dependent projection and an upstanding projection, said clutch actuating means including a pivotable lever for sliding the driving clutch member along said driving shaft, said transmission device including a driven gear having an upstanding projection adapted to be abutted by the dependent projection of the clutch member when the clutch means is engaged,
- an intermediate ring rotatably mounted on the driving clutch member and having upstanding and dependent projections formed on the periphery, the dependent projection on the intermediate ring and the upstanding projection of the clutch member being rotatable in the same plane to abut each other,
- a torsion spring interconnecting the cylindrical member and the clutch member, the spring biasing said clutch member in a linear direction to engage the dependent projection thereon with the upstanding projection on the driven gear and in a rotational direction to engage one face of the upstanding projection on the clutch member with one face of the dependent projection of the cylindrical member, rotation of the driving shaft rotating the cylindrical member almost a complete turn to abut the opposite face on the dependent projection thereon with the opposite face of the upstanding projection on the intermediate ring, the continued rotation of the driving shaft rotating the cylindrical member and intermediate ring until the dependent projection on the intermediate ring abuts the upstanding projection on the clutch member to couple the driving shaft with the driven gear.